United States Patent
Matsko et al.

(10) Patent No.: US 7,050,212 B2
(45) Date of Patent: May 23, 2006

(54) ACTIVE MODE-LOCKED LASERS AND OTHER PHOTONIC DEVICES USING ELECTRO-OPTIC WHISPERING GALLERY MODE RESONATORS

(75) Inventors: Andrey B. Matsko, Pasadena, CA (US); Vladimir Ilchenko, La Canada, CA (US); Anatoliy Savchenkov, La Crescenta, CA (US); Lutfollah Maleki, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 10/689,831

(22) Filed: Oct. 20, 2003

(65) Prior Publication Data

US 2004/0100675 A1    May 27, 2004

Related U.S. Application Data (60) Provisional application No. 60/428,349, filed on Nov. 22, 2002.

(51) Int. Cl.
*G02F 1/01* (2006.01)
*G02F 1/03* (2006.01)
*H01S 3/08* (2006.01)

(52) U.S. Cl. .................. 359/245; 359/239; 372/98; 372/108

(58) Field of Classification Search ............... 359/239, 359/245, 341.1; 372/6, 92, 94, 98, 104, 108; 385/1–3, 36, 39–40, 42, 146; 333/219, 219.1
See application file for complete search history.

(56) References Cited

U.S. PATENT DOCUMENTS

| 5,878,070 A | 3/1999 | Ho et al. ................. 372/92 |
| 5,929,430 A | 7/1999 | Yao et al. ................ 250/205 |
| 6,473,218 B1 | 10/2002 | Maleki et al. ............. 359/245 |
| 6,567,436 B1 | 5/2003 | Yao et al. ................ 372/32 |
| 6,762,869 B1* | 7/2004 | Maleki et al. ............. 359/239 |
| 6,873,631 B1* | 3/2005 | Yao et al. ................ 372/32 |
| 2002/0021765 A1* | 2/2002 | Maleki et al. ............. 375/300 |

FOREIGN PATENT DOCUMENTS

EP    0 533 390    3/1993

OTHER PUBLICATIONS

Ilchenko, V., et al., "Microsphere Integration in Active and Passive Photonics Device", *Proceedings of SPIE*, vol. 3930, pp. 154-162, Jan. 26-28, 2000.

Maleki, L., et al., "Novel Photonic Filter and Receiver Based on Whipering Gallery Mode Microresonators", *Proceedings of International Topical Meeting on Microwave Photonics*, pp. 181-184, Nov. 5-8, 2002.

(Continued)

*Primary Examiner*—Georgia Epps
*Assistant Examiner*—William Choi
(74) *Attorney, Agent, or Firm*—Fish & Richardson P.C.

(57) ABSTRACT

Techniques and devices using whispering gallery mode (WGM) optical resonators, where the optical materials of the WGM resonators exhibit an electro-optical effect to perform optical modulation. Examples of actively mode-locked lasers and other devices are described.

37 Claims, 6 Drawing Sheets

OTHER PUBLICATIONS

Cai et al.; Fiber-coupled microsphere laser; Oct. 1, 2000; Optics Letters, vol. 25, No. 19; pp. 1420-1432.

Cohen et al.; Microphotonic millimetre-wave receiver architecture; Jan. 4, 2001; Electronics Letters, vol. 37, No. 1; pp. 37-39.

Cohen et al.; Microphotonic Modulator for microwave receiver; Mar. 1, 2001; Electronics Letters, vol. 37, No. 5; pp. 300-301.

Fujiwara, et al.; Microspherical Lasing of an Erbium-Ion-Doped Glass Particle; Jan. 15, 2002; Jpn. J. Appl. Phys., vol. 41; pp. L46-L48.

Ilchenko, et al.; Whispering-gallery-mode electro-optic modulator and photonic microwave receiver; Feb. 2003; J. Opt. Soc. Am. B, vol. 20, No. 2; pp. 333-341.

Klitzing et al.; Very low threshold green lasing in microspheres by up-conversion of IR photons; 2000; J. Opt. B: Quantum Semiclass. Opt. 2; pp. 204-206.

Lallier, et al.; Integrated $Nd:MgO:LiNbO_3$ FM Mode-Locked Waveguide Laser; May 23, 1991; Electronics Letters, vol. 27, No. 11; pp. 936-937.

Sciancalepore et al.; Theoretical Modeling of FM Mode Locking in $Er:Ti:LiNbO_3$ Waveguide Lasers; Mar. 1999; IEEE Journal of Quantum Electronics, vol. 35, No. 3; pp. 400-409.

Yang, et al.; Gain Functionalization of silica microresonators; Apr. 15, 2003; Optics Letters, vol. 28, No. 8; pp. 592-594.

* cited by examiner

ACTIVE MODE-LOCKED LASERS AND OTHER PHOTONIC DEVICES USING ELECTRO-OPTIC WHISPERING GALLERY MODE RESONATORS

This application claims the benefit of U.S. Provisional Application No. 60/428,349 entitled "Mode Locking in Whispering Gallery Mode Resonators" and filed on Nov. 22, 2002, the entire disclosure of which is incorporated herein by reference as part of this application.

STATEMENT REGARDING FEDERALLY SPONSORED RESEARCH

The systems and techniques described herein were made in the performance of work under a NASA contract, and are subject to the provisions of Public Law 96-517 (35 USC 202) in which the Contractor has elected to retain title.

BACKGROUND

This application relates to optical whispering gallery mode resonators and devices using such resonators.

A dielectric material may be shaped to form an optical whispering-gallery-mode ("WGM") resonator which supports one or more whispering gallery ("WG") modes. These resonator modes represent optical fields confined in an interior region close to the surface of the resonator due to the total internal reflection at the boundary. Microspheres with diameters from few tens of microns to several hundreds of microns have been used to form compact optical WGM resonators. Such spherical resonators include at least a portion of the sphere that comprises the sphere's equator. The resonator dimension is generally much larger than the wavelength of light so that the optical loss due to the finite curvature of the resonators is small. As a result, a high quality factor, Q, may be achieved in such resonators. Some microspheres with sub-millimeter dimensions have been demonstrated to exhibit very high quality factors for light waves, ranging from 1000 to $10^9$ for quartz microspheres. Hence, optical energy, once coupled into a whispering gallery mode, can circulate within the WGM resonator with a long photon life time.

Such high Q values are generally difficult and expensive to obtain in conventional Fabry-Perot optical resonators formed with mirrors. The capability of producing high Q values makes the WGM resonators useful for many optical applications, including optical filtering, optical delay, optical sensing, lasers, and opto-electronic oscillators.

SUMMARY

This application describes examples of various devices and techniques that use an optical WGM resonator with an electro-optic material to modulate light in response to a control signal. In one implementation, for example, a device includes an optical resonator, an optical coupler, and an electrical unit that controls the optical resonator. The resonator supports whispering gallery modes. The material of the resonator exhibits an electro-optical effect and an optical gain at a laser wavelength when optically pumped by light at a pump wavelength. The resonator modulates light in response to a control electrical signal. The optical coupler is used to couple a pump beam at the pump wavelength into a pump whispering gallery mode in the resonator to produce laser light in a laser whispering gallery mode at the laser wavelength. The electrical unit has electrodes formed on the resonator to apply the control electrical signal to the resonator to modulate the laser light. This modulation causes mode locking in the laser light to produce laser pulses.

In another implementation, a method is disclosed to provide a whispering gallery mode (WGM) resonator to exhibit both an electro-optic effect for optical modulation and an optical gain at a laser wavelength when optically pumped at a pump wavelength. According to this method, the pump light at the pump wavelength is coupled into the WGM resonator to generate laser light in whispering gallery modes at the laser wavelength. An electrical control signal is applied to the resonator to modulate the laser light and to lock the whispering gallery modes at the laser wavelength to produce laser pulses.

As another example, this application describes a device that includes an optical ring having a gain section to produce an optical gain at a laser wavelength and carrying laser light at the laser wavelength. This device further includes an electro-optic modulator coupled in the optical ring to modulate the laser light in response to a modulator control signal. The modulator includes a whispering gallery mode (WGM) resonator which exhibits an electro-optical effect, electrodes on the WGM resonator to receive the modulator control signal, and a controller to produce the modulator control signal. This device may further include an optical coupler coupled in the optical ring to split a portion of the laser light, an optical detector to convert light from the optical coupler into an electrical detector signal, and an electrical section to receive and process the electrical detector signal to produce the modulator control signal.

As yet another example, this application further describes a device that has a CW laser to produce a CW laser beam and an optical resonator supporting whispering gallery modes. The resonator has an optical material which exhibits an electro-optical effect and is optically coupled to receive the CW laser beam and to modulate the CW laser beam in response to a control electrical signal. This modulation produces laser pulses that have a spectral comb formed by modulation bands as a result of the modulation.

These and other implementations, and associated advantages are now described in greater detail in the following figures, the detailed description, and the claims.

DETAILED DESCRIPTION

An optical WGM resonator may be made of a material that includes an electro-optic material to provide electro-optic modulation of light in a WG mode when a proper electrical control signal is applied. See, e.g., U.S. Pat. No. 6,483,218 to Maleki et al. An electrical coupler, such as electrodes formed on or near the exterior of the WDM resonator, is used to apply the electrical control signal to the region of the resonator where the modulated WDM mode resides. The electrical control signal may co-propagate in the same path with the light in the WG mode. This applied electrical signal modulates the dielectric constant of the resonator and hence the resonance condition of the WDM mode of the light to be modulated. As a result, this modulation in the resonance condition modulates the phase, intensity, or both phase and intensity of the optical output from the WGM resonator.

This application includes various devices and systems that use such electro-optic WGM resonators. The following sections first describe various exemplary WGM resonator configurations suitable for such devices and systems. Examples of mode-locked lasers and other devices will then be presented.

Figure 1:
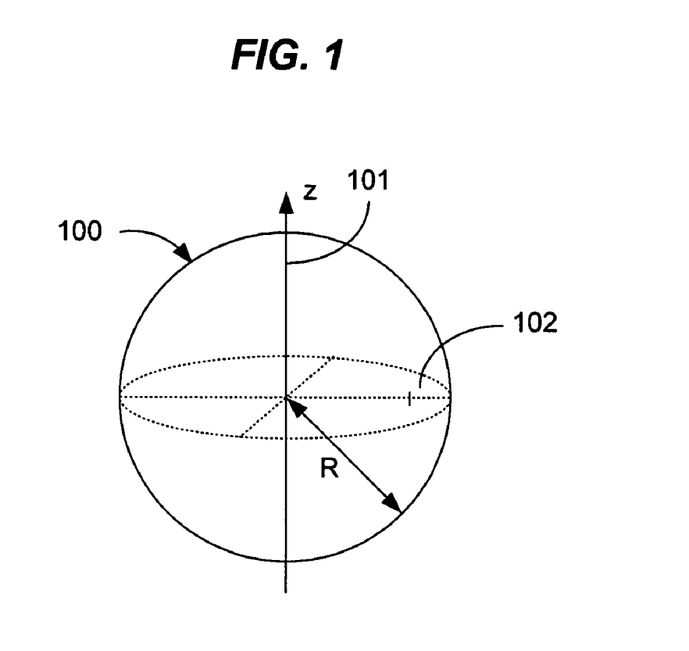
FIGS. 1, 2, 3, 4A, and 4B illustrate various exemplary resonator configurations that support whispering gallery modes and are suitable for implementing various devices described in this application.
Figure 2:
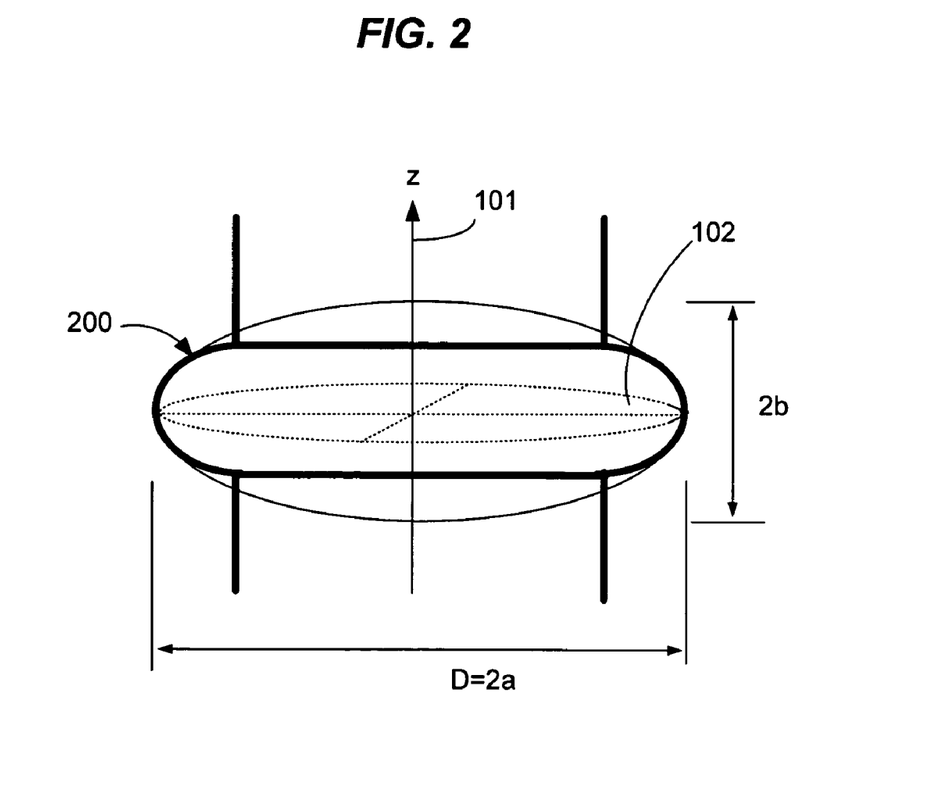
Figure 3:
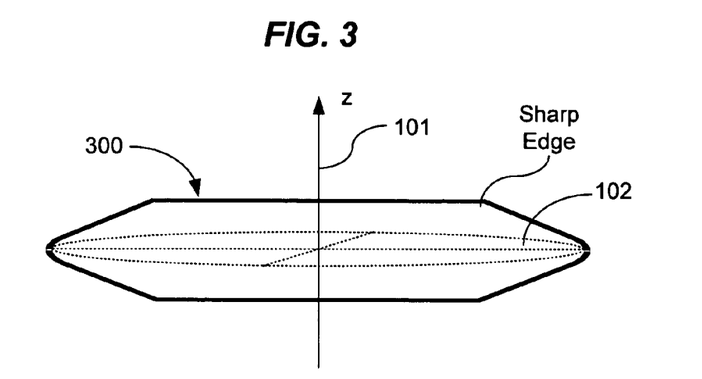

FIGS. 1, 2, and 3 illustrate three exemplary geometries for implementing the WGM resonators with nonlinear optical dielectric materials.

FIG. 1 shows a spherical WGM resonator 100 which is a solid dielectric sphere formed from a nonlinear optical material. The sphere 100 has an equator in the plane 102 which is symmetric around the z axis 101. A WG mode exists around the equator within the spherical exterior surface and circulates within the resonator 100. The spherical curvature of the exterior surface around the equator plane 102 provides spatial confinement along both the z direction and its perpendicular direction to support the WG modes. The eccentricity of the sphere 100 generally is low.

FIG. 2 shows an exemplary spheroidal microresonator 200 formed from a nonlinear optical material. This resonator 200 may be formed by revolving an ellipse (with axial lengths a and b) around the symmetric axis along the short elliptical axis 101 (z). The eccentricity of resonator 100 is $(1-b^2/a^2)^{1/2}$ and is generally high, e.g., greater than $10^{-1}$. Hence, the exterior surface is the resonator 200 is not part of a sphere and provides more spatial confinement on the modes along the z direction than a spherical exterior. The equator plane 102 at the center of the resonator 200 is perpendicular to the axis 101 (z) and the WG modes circulate near the circumference of the plane 102 within the resonator 200.

FIG. 3 shows another exemplary WGM resonator 300 which has a non-spherical exterior where the exterior profile is a general conic shape which can be mathematically represented by a quadratic equation of the Cartesian coordinates. Similar to the geometries in FIGS. 1 and 2, the exterior surface provides curvatures in both the direction in the plane 102 and the direction of z perpendicular to the plane 102 to confine and support the WG modes. Such a non-spherical, non-elliptical surface may be, among others, a parabola or hyperbola.

The above three exemplary geometries in FIGS. 1, 2, and 3 share a common geometrical feature that they are all axially or cylindrically symmetric around the axis 101 (z) around which the WG modes circulate in the plane 102. The curved exterior surface is smooth around the plane 102 and provides two-dimensional confinement around the plane 102 to support the WG modes.

Notably, the spatial extent of the WG modes in each resonator along the z direction 101 is limited above and below the plane 102 and hence it may not be necessary to have the entirety of the sphere 100, the spheroid 200, or the conical shape 300. Instead, only a portion of the entire shape around the plane 102 that is sufficiently large to support the whispering gallery modes may be used to for the WGM resonator. For example, rings, disks and other geometries formed from a proper section of a sphere may be used as a spherical WGM resonator.

Figure 4A:
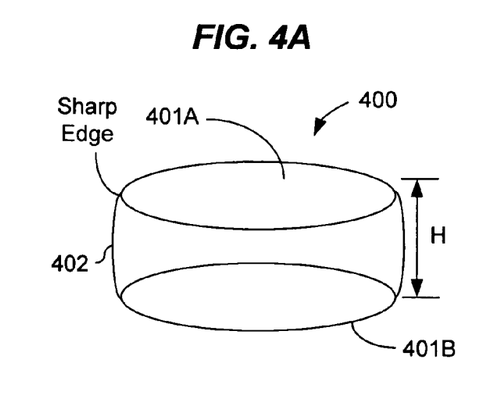
Figure 4B:
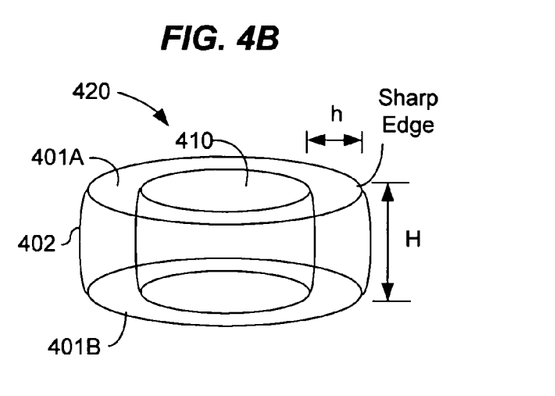

FIGS. 4A and 4B show a disk-shaped WGM resonator 400 and a ring-shaped WGM resonator 420, respectively, formed from nonlinear optical materials. In FIG. 4A, the solid disk 400 has a top surface 401A above the center plane 102 and a bottom surface 401B below the plane 102 with a distance H. The value of the distance H is sufficiently large to support the WG modes. Beyond this sufficient distance above the center plane 102, the resonator may have sharp edges as illustrated in FIGS. 3, 4A, and 4B. The exterior curved surface 402 can be selected from any of the shapes shown in FIGS. 1, 2, and 3 to achieve desired WG modes and spectral properties. The ring resonator 420 in FIG. 4B may be formed by removing a center portion 410 from the solid disk 400 in FIG. 4A. Since the WG modes are present near the exterior part of the ring 420 near the exterior surface 402, the thickness h of the ring may be set to be sufficiently large to support the WG modes.

Figure 5A:
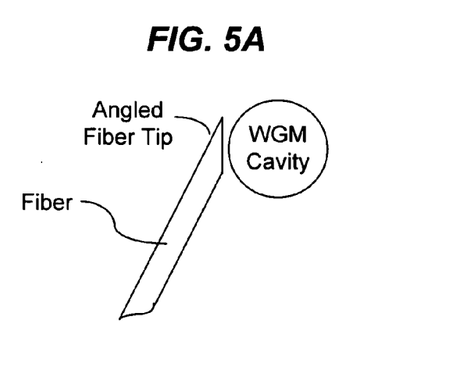
FIGS. 5A and 5B illustrate two exemplary evanescent couplers for a WGM resonator.
Figure 5B:
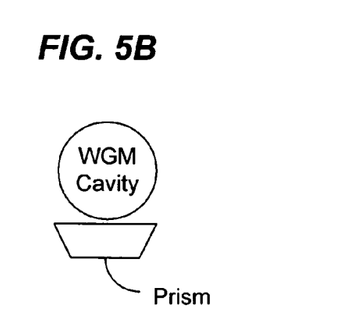

An optical coupler is generally used to couple optical energy into or out of the WGM resonator by evanescent coupling. FIGS. 5A and 5B show two exemplary optical couplers engaged to a WGM resonator. The optical coupler may be in direct contact with or separated by a gap from the exterior surface of the resonator to effectuate the desired critical coupling. FIG. 5A shows an angle-polished fiber tip as a coupler for the WGM resonator. FIG. 5B shows a micro prism as a coupler for the WGM resonator. Other evanescent couplers such as a coupler formed from a photonic bandgap material or tapered fiber may be used. A single optical coupler may be used to couple one or more input signals into the nonlinear WGM resonator. Separate optical couplers may be used to respectively couple different input signals into the resonator. Optical coupling of an output signal from the resonator may be achieved by sharing an input coupler or by using a designated output coupler.

In WGM resonators with uniform indices, a part of the electromagnetic field of the WG modes extends to the exterior surface of the resonators. A gap between the optical coupler and the WGM resonator with a uniform index is generally needed to achieve a proper optical coupling. This gap is used to properly "unload" the WG mode. The Q-factor of a WG mode is determined by properties of the dielectric material of the WGM resonator, the shape of the resonator, the external conditions, and strength of the coupling through the coupler (e.g. prism). The highest Q-factor may be achieved when all the parameters are properly balanced to achieve a critical coupling condition. In WGM resonators with uniform indices, if the coupler such as a prism touches the exterior surface of the resonator, the coupling is strong and this loading can render the Q factor to be small. Hence, the gap between the surface and the coupler is used to reduce the coupling and to increase the Q factor. In general, this gap is very small, e.g., less than one wavelength of the light to be coupled into a WG mode. Precise positioning devices such as piezo elements may be used to control and maintain this gap at a proper value. Certainly, a dielectric film may be coated on the exterior surface of the WGM resonator to allow for direct physical contact between the coupler and coated resonator for the proper evanescent coupling. This design eliminates the technical difficulty in maintaining a desired gap.

Figure 6A:
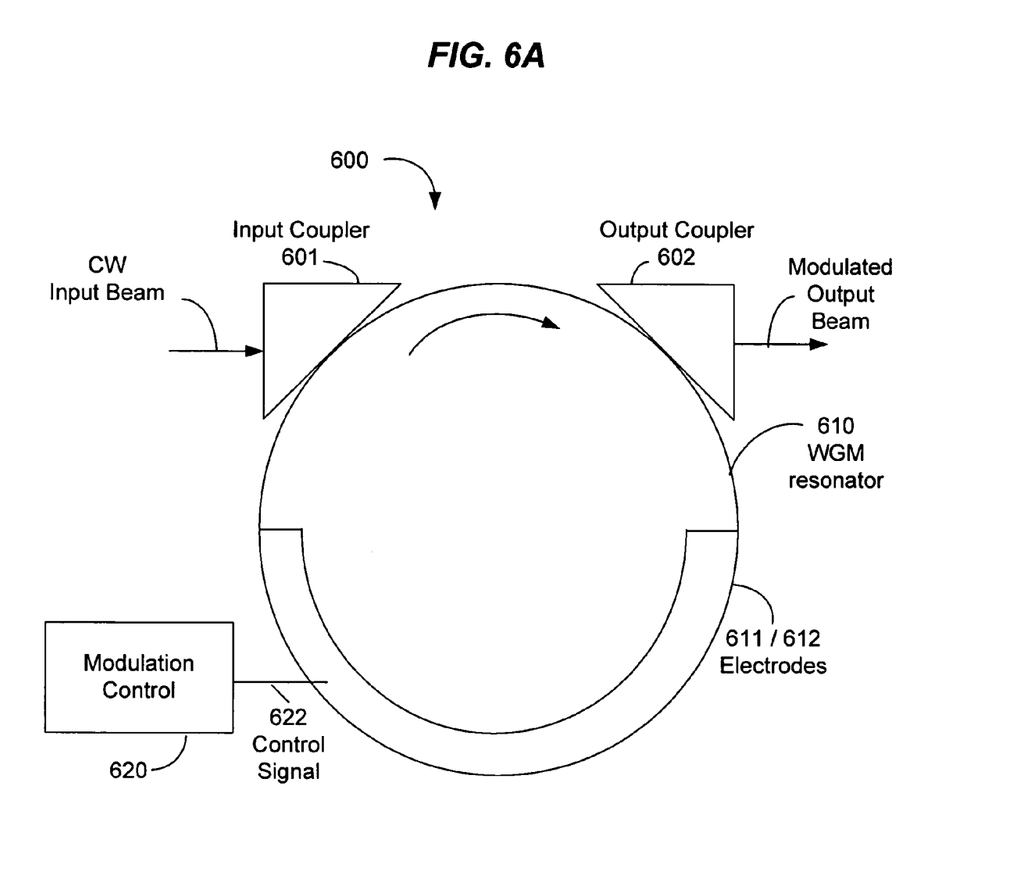
FIGS. 6A and 6B shows an exemplary electro-optic modulator having a WGM resonator.
Figure 6B:
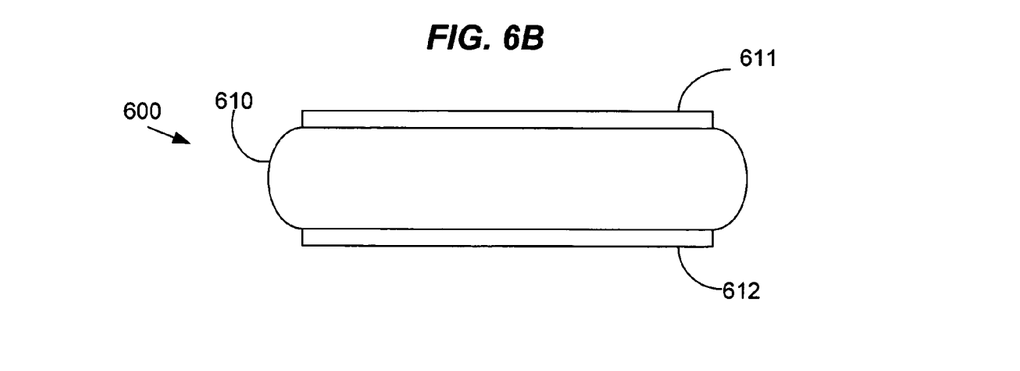

FIGS. 6A and 6B shows an example of an electro-optic WGM resonator modulator 600 that may be used in the mode-locked lasers and other devices described in this application. The modulator 600 uses a WGM resonator 610 that is made of an electro-optic material. Examples of the suitable materials include but are not limited to an electro-optic crystal such as Lithium Niobate and semiconductor multiple quantum well structures. One or more electrodes 611 and 612 may be formed on the resonator 610 to apply the control electrical field in the region where the WG modes are present to control the index of the electro-optical material and to change the filter function of the resonator. Assuming the resonator 610 has disk or ring geometry as in FIG. 4A or 4B, the electrode 611 may be formed on the top of the resonator 610 and the electrode 612 may be formed on the bottom of the resonator 610 as illustrated in the side view of the device in FIG. 6B. In one implementation, the electrodes 611 and 612 may constitute an RF or microwave resonator to apply the RF or microwave signal to co-propagate along with the desired optical WG mode. The electrodes 611 and 612 may be microstrip line electrodes.

The modulator 600 may include an input optical coupler 601 to couple light such as a CW laser beam into the WGM resonator and an output optical coupler 602 to couple light out of the WGM resonator as a modulated output. Each coupler may be a fiber coupler, a prism coupler, a photonic bandgap coupler, or other suitable couplers. Alternatively, a single coupler may be used for both input coupling and the output coupling.

A modulation control 620 is provided in the modulator 600 to supply a control signal 622 to the electrodes 611 and 612. the control 620 may be a microwave or RF signals generator to produce the control signal 622 with a desired modulation frequency. The control 620 may be tunable so that the modulation frequency may be adjusted.

Figure 7:
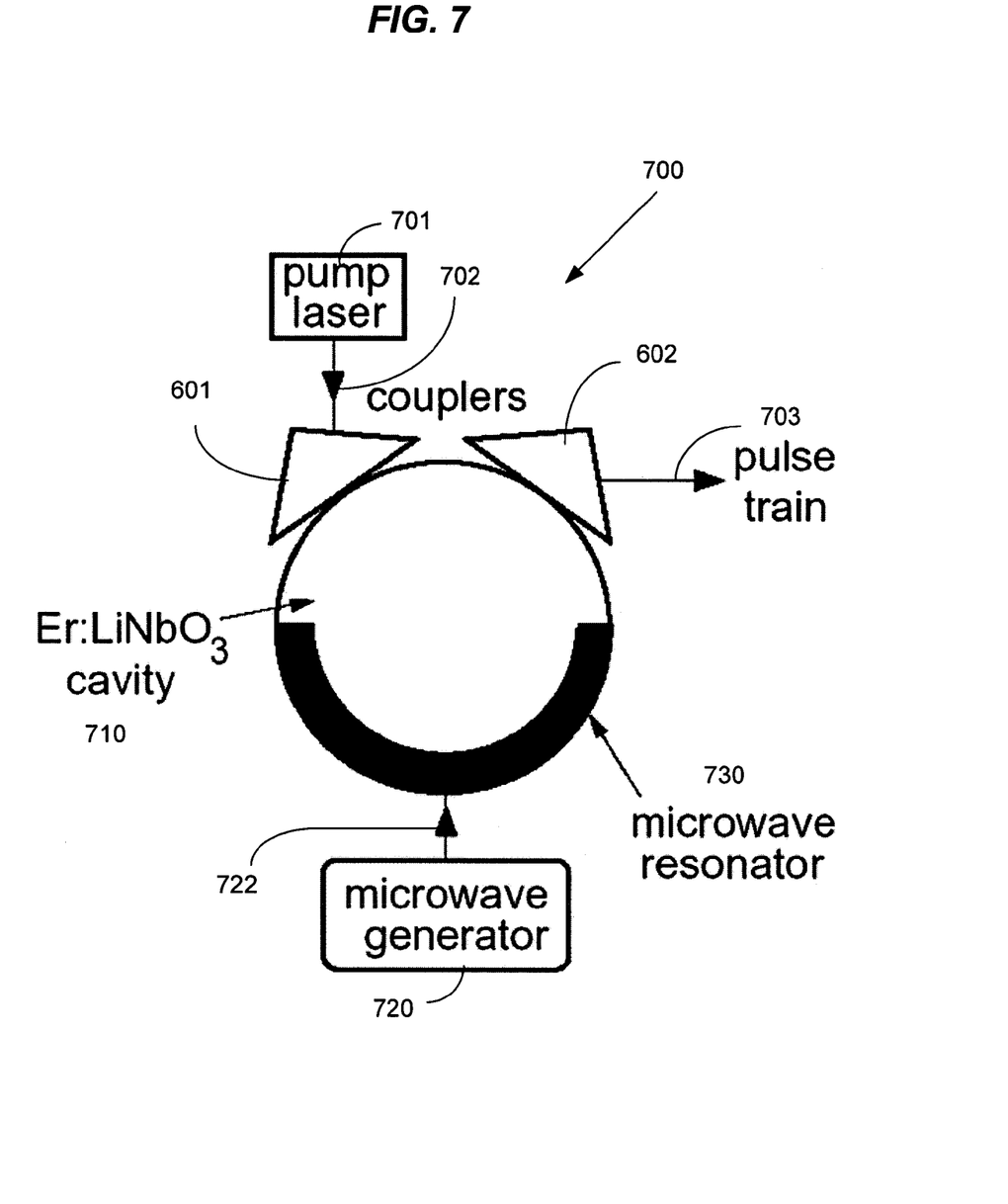
FIG. 7 shows an exemplary actively mode-locked laser that integrates an intracavity electro-optic modulator and a laser gain medium into a WGM resonator. The WGM resonator operates as an optical modulator, a gain medium, and a laser resonator, where the dielectric material in the WGM resonator exhibits both the electro-optical effect for light modulation and an optical gain at a laser wavelength under optical pumping at a pump wavelength.

FIG. 7 shows one implementation of an active mode-locked laser 700 using an electro-optic WGM resonator 710 as both the modulator and the laser cavity. The WGN resonator 710 produces both an electro-optic effect and an optical gain under proper optical pumping. In one implementation, the material for the WGM resonator may be an electro-optic material doped with active ions to produce the desired laser gain, such as Er-doped $LiNbO_3$ crystals. In another implementation, the resonator 710 may include a resonator core made from an electro-optic material and a thin active laser medium formed over the core with a thickness comparable to the volume occupied by the optical WGM modes for the laser light and the pump light. This design allows for separate selection of the electro-optic material and the laser gain material. For example, erbium-doped solgel films may be applied to the surface of lithium niobate cavity to create low-threshold microcavity mode-locked lasers. Silica microsphere lasers with applied solgel films were demonstrated. See, Yang et al., "Gain functionalization of silica microresonators," Optics Letters, Vol. 28, No. 8, pages 592–594 (April, 2003). In such a coated resonator 710 for the laser 700, the solgel generally does not reduce the quality factor of the microcavity significantly, while the erbium ions are coupled to the cavity modes via evanescent field.

The WGM resonator 710 generally may be a micro cavity with a dimension less than millimeters or even less than $10^2$ microns. Therefore, the laser 700 using such a WGM resonator can have a very short time for light in a WG mode to make a round trip in the cavity. One advantage of this short round-trip time is the possibility of achieving a high pulse repetition rate without complex optical filtering.

The WGM resonator 710 is optically pumped by a pump beam 702 at a desired pump wavelength based on the active ions doped in the resonator material. A pump light source 701 such as a laser is used to produce the optical pump beam 702. An input coupler 601 is used to couple the pump beam 702 into the resonator 710 to excite the active ions which in turn produces the optical gain at a laser wavelength, usually longer than the pump wavelength. The light at the laser wavelength generated by the active ions circulates and accumulates inside the resonator 710 to build up laser oscillation in one or more WGM modes at the laser wavelength. An output coupler 602 is used to couple the light at the laser wavelength out of the WGM resonator 710 to produce a laser output 703.

The laser 700 also includes electrodes 730 to supple an electrical modulation signal 722 from a control 720. FIG. 7 shows the electrodes 730 as a microwave resonator and the control as a microwave generator as one exemplary implementation of the electro-optic modulation for active mode locking. In operation, the modulation frequency of the signal 722 is tuned to a desired frequency to lock the laser modes. After the mode locking is established, the laser output 703 becomes laser pulses with a high pulse repetition rate.

The features, operations, and advantages of the mode-locked laser 700 in FIG. 7 are described in details below.

The mode-locked laser 700 integrates active mode locking by electro-optic modulation and laser oscillation in the same micro WGM resonator 710. Laser pulses with a pulse duration on the order of picosecond and a high pulse repetition rate on the order of 100 GHz may be achieved in the laser 700. In general, the laser 700 may be used to produce lasers at various laser wavelengths by using different active ions. Use of rare earth ions such as Er ions in the resonator 710 as the active laser materials allows for laser oscillation at wavelengths around 1.3 and 1.5 microns. High-repetition rate picosecond optical pulses at wavelength around 1.5 microns have important applications in modern optical telecommunications and microwave photonics applications. Actively mode-locked lasers based on intracavity amplitude or phase modulation may be used to meet the requirements of telecom applications. The repetition rate of mode-locked lasers is generally restricted by the pulse roundtrip time in the cavity. The shorter is the round-trip time, the higher is the repetition rate. High repetition rate fiber lasers with long roundtrip time are operated in a high order harmonic configurations and suffer from mode competition. Stabilization of such lasers requires use of intracavity narrow-band filters. Hence, the laser 700 with a micro WGM resonator is advantageous in this regard because it has a very shot round trip time.

In one implementation, Erbium doped $LiNbO_3$ may be used as the material for the resonator 710 because of its excellent electro-optic properties, and because of Er solubility in $LiNbO_3$ crystals without fluorescence quenching.

The laser 700 may be designed to generate low jitter picosecond optical pulse trains and to consume low microwave power. The electro-optic modulation of light in a WG mode can achieve high efficiency light modulation with a small controlling microwave power, e.g. 1 mW operational power and 10 mW full saturation at 9 GHz modulation frequency, and 10 mW operational power at 33.1 GHz. This low power operation allows for the modulation frequency up to 100 GHz or higher feasible while the power consumption for the modulation remains within a practically feasible range. The high quality factor of the micro resonator 710 can be used to a low oscillation threshold for the optical pumping, e.g., at a pumping power of about several micro watts. The use of the micro resonator 710 may also avoid use of any active control of the optical cavity length. Hence, the laser 700 combines the low threshold optical pumping in the WGM resonator 710 and the high frequency WGM modulation to provide an advanced mode locked laser As an example, the laser 700 may be implemented as follows. The pump source 701 may be a CW pump laser at $\lambda_p$=1.48 µm. The couplers 601 and 602 may be diamond prisms. The WGM resonator 710 may be z-cut Er: LiNbO$_3$ spheroid optical cavity. The oblate spheroid cavity shape is used to clean up the cavity spectrum. Modes of the cavity with frequencies $\lambda$s around 1.54 µm experience amplification due to interaction of the pump and the erbium ions. The system emits coherent CW radiation at $\lambda_s$, when the pump power exceeds the laser threshold value.

The electrodes 730 may include two electrode plates on two sides of the resonator 710 to form a microwave resonator. The resonant frequency of the microwave field can be adjusted to fit the frequency difference between optical modes by controlling or changing the microwave resonator shape. Based on the quadratic nonlinearity of LiNbO$_3$, the modes of the microwave resonator and optical cavity can be effectively coupled. This coupling can increase significantly for resonant tuning of the fields due to high quality factors of the modes of optical cavity and microwave resonator as well as small mode volumes of the optical and microwave modes.

The device 700 in FIG. 7 becomes an actively mode-locked laser when both CW microwave radiation and optical pump are applied. Interaction of the fields generates optical pulses in the cavity 710. Because the optical amplification procedure is not phase sensitive, WGM optical pulses running in both directions around the cavity rim should be observed. FIG. 7 shows one exemplary optical coupling configuration where laser pulses moving in the opposite direction relative to the direction of the pump propagation are coupled out as the laser output 703. Alternatively, the laser pulses in the pump direction may be coupled out as the laser output 703.

The following sections describe the cavity mode dispersion and optical pulse propagation in WGM cavity 710 in the laser 700.

Let us compare a ring cavity made of a dispersive fiber and a solid WGM cavity fabricated from a dispersionless material. Assume both cavities have the same radius R. We estimate parameters of the fiber to make the cavities be identical, in the context that mode frequency differences ($\omega_{v+1}-\omega_v$) and ($\omega_{v+1}+\omega_{v-1}-2\omega_v$) should be the same for both cavities, where the mode number is v and is much greater than 1 for practical micro resonators like this (v>>1).

Frequency of whispering gallery modes may be estimated as follows:

$$\frac{n_0}{c}\omega_v \cong \frac{v}{R}\left[1+\frac{1.86}{v^{2/3}}\right]. \quad (1)$$

The following expressions can be derived:

$$\frac{n_0}{c}(\omega_{v+1}-\omega_v) \cong \frac{1}{R}\left[1+\frac{0.62}{v^{2/3}}\right], \quad (2)$$

$$\frac{n_0}{c}(\omega_{v+1}+\omega_{v-1}-2\omega_v) \cong -\frac{1}{R}\frac{0.41}{v^{5/3}}. \quad (3)$$

For a fiber-made cavity, the resonant mode frequencies may be obtained from the following equation:

$$\frac{n_{w_v}}{c}\omega_v = \frac{v}{R}. \quad (4)$$

The following decomposition is used to estimate the cavity dispersion:

$$\frac{\omega}{c}n(\omega) \cong \frac{\omega_0}{c}n_0 + \beta'(\omega-\omega_0) + \frac{1}{2}\beta''(\omega-\omega_0)^2, \quad (5)$$

where $$\beta' = \frac{1}{u_g} = \frac{1}{c}\left(n+\omega\frac{dn}{d\omega}\right), \quad (6)$$

$$\beta'' = \frac{1}{c}\left(2\frac{dn}{d\omega}+\omega\frac{d^2n}{d\omega^2}\right), \quad (7)$$

are the first and the second dispersion coefficients, respectively; $v_g$ is a group velocity in the fiber. Based on the above, the following can be derived:

$$\omega_{v+1}-\omega_v \cong \frac{1}{R\beta'}, \quad (8)$$

$$\omega_{v+1}-2\omega_v+\omega_{v-1} = -\frac{\beta''}{R^2\beta'^3}. \quad (9)$$

Therefore, according to Equations (2) and (3) as well as Equations (8) and (9), the parameters of a fiber that results in the same mode structure in a fiber ring cavity as in a solid microsphere are $$\beta' = \frac{n_0}{c}\left[1+\frac{0.62}{v^{2/3}}\right]^{-1}, \quad (10)$$

$$\beta'' = \frac{n_0}{c\omega_v}\frac{0.41}{v^{2/3}}, \quad (11)$$

where $n(\omega_v)=n_0$.

It is useful to estimate the second order dispersion coefficient for a WGM cavity and compare it with that of a fiber.

In fiber-optic literature dispersion parameter D is commonly used. The parameter D for WGMs can be expressed as $$D = -\frac{2\pi c}{\lambda^2}\beta'' = -\frac{n_0}{\lambda c}\frac{0.41}{v^{2/3}}. \tag{5}$$

For usual parameters such as v=5000, λ=1.55 μm, and $n_o$=2.14, it can be estimated that D=−6.5 ps/(km nm). This value is comparable with the dispersion of usual optical fibers and it may be neglected in the problem of picosecond pulse generation.

Therefore, the dispersion of the WGM cavity is normal dispersion, i.e., longer wavelength pulses travel faster than pulses with shorter wavelengths. This might be explained by the fact that longer wavelength modes are localized deeper in the microsphere and, therefore, their paths are shorter than the modes with shorter wavelengths.

The absorption length per round trip in the WGM cavity may be computed as follows:

$$l = \frac{2\pi v}{Q}, \tag{12}$$

where Q is the quality factor of the WG mode. As an example, if Q=$10^5$, the absorption length l is about 0.006. WGM resonators can be designed to achieve high Q values e.g., exceeding $10^7$. Inventors of this application demonstrated that Q may be as large as 2×$10^8$ for disk cavities having 3 mm in diameter and approximately 100 μm in thickness. It appears that the quality factor for the pump light in the laser 700 may be restricted by the absorption of erbium ions.

The properties of the integrated WGM modulator and erbium amplifier in the laser 700 in FIG. 7 are now described in details. In general, there is a significant difference between Constructon of the modulator in the laser 700 where the interaction length in the modulator is not much shorter than the total length of the optical resonator, and intracavity modulators in some other mode-locked lasers where the length of the modulator is generally much shorter than the length of the pulse round trip in a cavity. In these other mode-locked lasers, it may be assumed that the interaction time of the pulse and the modulator is short enough and use this fact for a decomposition of the expression for the modulator response by a small parameter $\omega_M t$, where $\omega_M$ is the modulation frequency, and t is the interaction time.

In the laser 700, the length of the modulator is comparable with the path length of a pulse. Therefore, the above assumption is no longer valid. For example, the electrodes 730 may be designed so that a pulse travels a half of its round trip time in the modulator, i.e., $\omega_M t \cong \pi$. The following is an analysis of the laser 700 by using an analytical approach.

Another unique property of the laser 700 is that the microwave field is excited in a microwave resonator 730 and the amplitude of the microwave field spatially changes with position along the rim of the cavity 710 in addition to the change in time. This allows for an efficient modulation and interaction among cavity modes.

Let us assume that the pulse length is much smaller than the modulator length. Then the round trip transmission through the modulator can be expressed by $$e^{i\delta(t)} = \exp\left[\frac{i}{2}\omega_0 n_0^2 r_{\mathit{eff}} \int_0^{\pi/\omega_M} E_M(\tau, t)d\tau\right], \tag{13}$$

where t characterizes the time of entrance of the pulse into the modulator, $E_M(\tau, t)$ is the microwave electric field that the pulse sees, $r_{\mathit{eff}}$ is the electro-optic constant of the material. The electro-optic constant is not necessary coincides with $r_{33}$ because we may use either TE or TM modes, and the electric field in the resonator may be not exactly aligned with z direction due to boundary effects for the microwave cavity.

The electric field that short pulse sees at time τ in the modulator may be approximated as $$E_M(\tau, t) = E_{m0}\sin\left(\frac{\pi}{2} - \omega_M \tau\right)\cos[\omega_M(\tau + t)], \tag{14}$$

where the "cos" term appears due to temporal modulation of the field, and "sin" results from the pulse motion in the microwave resonator. Eq. (14) shows, for example, that the maximum modulation is on the boundaries of the resonator and there is no modulation in the middle of the resonator. The amplitude of the electric field may be presented as $$E_{M0} = \sqrt{\frac{8\pi W_M Q_M}{\varepsilon_M \omega_M V_M}}, \tag{15}$$

where $W_M$ is the microwave power feeding into the resonator, $Q_M$ is the quality factor of the microwave resonator, $\varepsilon_M$ is the susceptibility of LiNbOP$_3$ at the microwave frequency, and $V_M$ is the volume of the microwave resonator.

Substituting (14) into (13), the following equation can be derived $$e^{i\delta(t)} = e^{2i\delta_e \cos \omega_M t}, \tag{16}$$

where $\delta_e$ is a single pass modulation coefficient defined as $$\delta_e = \frac{\pi}{8}v n_0^2 r_{\mathit{eff}} E_{M0}. \tag{17}$$

Notably, this expression is similar to the expression used for a description of short cavity modulators implemented in a mode-locked laser cavities. Therefore, even in the case of a long modulator, the conventional mode locking theory is still valid and thus applicable. In the laser 700, the parameter t is the relative time of entrance of the pulse into the modulator. In accordance with the standard FM mode locking theory, a pulse should enter the modulator at the point of maximum field amplitude cos $\omega_M t = \pm 1$.

Let us find the numerical value for $\delta_e$, for the following parameters: $r_{\mathit{eff}}$=$10^{-11}$ m/V=3×$10^{-7}$ CGS, $V_M$=$10^{-4}$ cm$^3$, $W_M$=1 mW=$10^{-4}$ erg, v=5000, $n_o$=2.14, $\varepsilon_M$=29, $\omega_M$=2π×10 GHz, and $Q_M$=100. Our computation yields $\delta_e$=$10^{-3}$.

The active medium in the laser 700 has a number of functions. It absorbs the pump at the pump wavelength and provides the amplification of light at the laser wavelength. Due to the absorption of the pump light, the active medium reduces the effective quality factor for the whispering gallery mode the pump interacts with. In addition, the active medium also operates as an optical filter to filter the signal pulses at the laser wavelength. To an extent, the active medium in the laser 700 has properties similar to the properties of usual fiber erbium amplifiers. Based on this analogy, the active medium in the laser 700 may be characterized by homogeneous linewidth $\delta\lambda \approx 10$ nm or, in frequency units, $\Gamma \approx 2\pi \times 1.2 \times 10^{12}$ rad/s. Assuming that the pulses are much longer than the inversed homogeneous gain linewidth, the amplitude gain may be approximately expressed as $$g(w) \cong e^g \exp\left[2i\frac{g}{\Gamma}(\omega-\omega_0) - \frac{g}{\Gamma^2}(\omega-\omega_0)^2\right], \quad (18)$$

where g is the saturated amplitude gain through the active medium at the line center for one round trip in the cavity.

The lasing threshold pump power may be roughly estimated as follows. The gain depends on the pump power W as $$g \approx \frac{Wl_d}{W+W_{sat}}, \quad (19)$$

where $W_{sat}$ is the saturation pump power for the pump transition, $l_d$ is the dopant mediated resonant linear absorption of the signal with no pump applied. Eq. (19) suggests that the gain cannot exceed this linear absorption of the signal and the maximum gain is achieved when the pump creates complete population inversion in the medium. To achieve generation the gain should exceed $l_s$, the residual attenuation of the signal not connected with the dopants. Generally speaking, it is true that $l_d \gg l_s$, and therefore $W_{th} \approx (l_s/l_d)W_{sat}$. It is known, that typical saturation pump power for an erbium doped fiber amplifier, for example, is approximately $W_{EDFA}$, =1 mW. To achieve such a power in the cavity, external pump power should be smaller. The ratio of the pump power inside and outside the cavity is equal to the cavity finesse for the pump light $F_p \approx l_d^{-1}$, i.e., $W_{sat\,cav} \approx l_d W_{EDFA}$. Therefore, threshold pump power for the cavity based laser is $W_{th} \approx l_s W_{EDFA}$. This value may be less than a microWatt. This estimate is consistent with experimental data for CW lasers using WGM cavities.

Hence, the laser 700 in FIG. 7 is a unique active mode-locked laser by integrating electro-optic modulation and laser gain medium in a WGM resonator. The threshold of the generation can be fairly low compared with conventional FM mode locked lasers because of the high quality factor of the whispering gallery modes. The consumption of the microwave power can be low as well because the performance of electro-optic modulator is resonantly enhanced. In addition, the size of the integrated device is compact in comparison with other typical active mode-locked lasers.

The duration of the pulses generated in the laser 700 may be estimated using the following equations:

$$\delta t = \frac{\sqrt{2\sqrt{2}}}{\pi} \ln 2 \left(\frac{g}{\delta_e} \frac{(2\pi)^4}{\Gamma^2 w_M^2}\right)^{1/4}. \quad (20)$$

Assuming that $g \cong l = 0.006$, $\delta_e = 0.001$, $\Gamma \approx 2\pi \times 1.2 \times 10^{12}$ rad/s, and $w_M = 2\pi \times 10$ GHz, the pulse duration for the laser 700 is $\delta t \approx 6$ ps. This value may be further reduced if higher modulation frequency is used. Such high modulation frequencies may be achieved in electro-optic WGM modulators. See, e.g., Ilchenko et al., "Whispering-gallery-mode electro-optic modulator and photonic microwave receiver," Journal of Optical Society of America, B. Vol. 20, No. 2, pages 333–342 (February 2003). For example, a modulation/repetition rate at 100 GHz corresponds to a pulse duration of about 2 ps.

In addition to the integrated active mode-locked lasers, other devices may also be constructed based on the electro-optic WGM modulator in FIGS. 6A and 6B.

Figure 8:
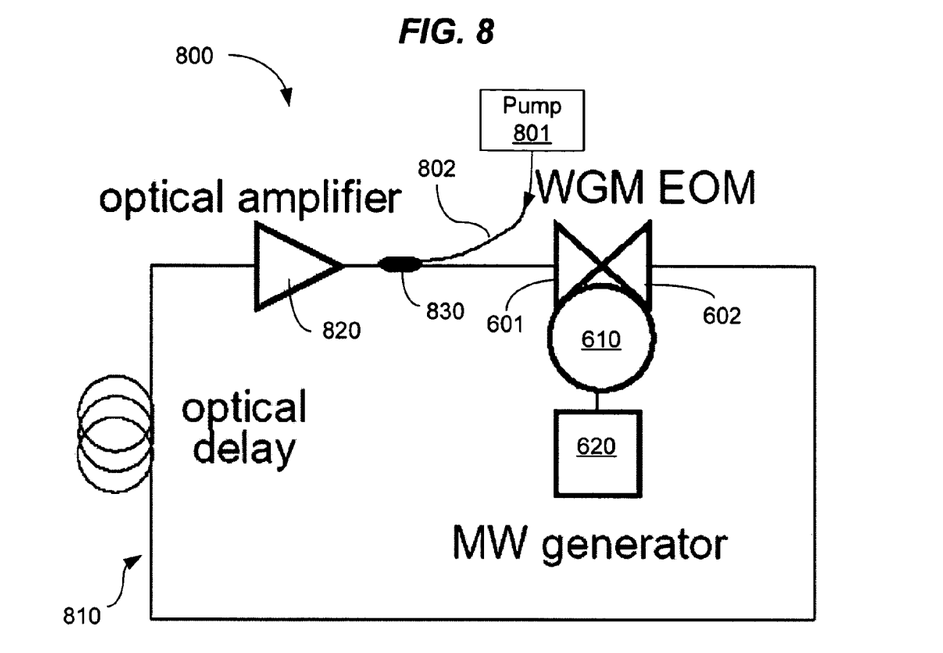
FIG. 8 shows another example of an actively mode-locked ring laser having an intracavity electro-optic WGM resonator modulator.

FIG. 8 shows an exemplary actively mode-locked ring laser 800 having a closed optical ring 810 and an optical amplifier 820 in the ring 810. The optical amplifier 820 may be an electrically-energized semiconductor optical amplifier or an optically-pumped optical amplifier. The illustrated implementation of the amplifier 820 for the ring laser 800 is an optically pumped laser gain medium such as an Er-doped fiber optical amplifier (EDFA) for absorbing pump light at a pump wavelength to produce laser gain at a laser wavelength. A wavelength-selective optical coupler 830, e.g., a WDM fiber coupler, is coupled near the amplifier 820 to inject a pump beam 802 at the pump wavelength from a pump light source 801 into the ring 810 to pump the amplifier 820. The ring 810 may be a fiber ring to form a fiber ring laser. The length of the fiber ring 810 may be set to achieve a desired total cavity length or optical delay for the laser 800.

Figure 9:
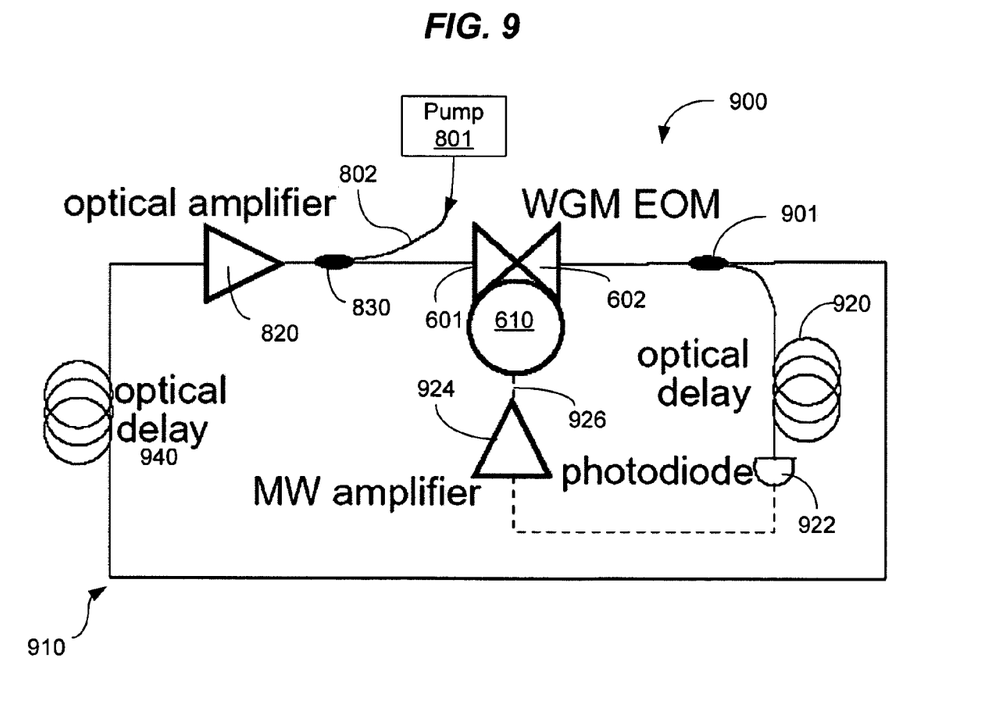
FIGS. 9 and 10 show two examples of a coupled opto-electronic oscillators using the electro-optic WGM resonator modulator in FIGS. 6A and 6B.

Notably, the laser 800 implements the electro-optic WGM resonator modulator 600 in FIGS. 6A and 6B to achieve desired active mode locking in the ring 810. The WGM modulator 600 can improve performance of the actively mode locked laser 800 because it can produce significant modulation with low power microwave pump at very high microwave frequencies. Notably, the WGM modulator 600 not only modulates light but also operates as an intracavity etalon within the ring cavity 810 to select the proper mode or modes to oscillate in the ring 810. The input and output optical couplers 601 and 602 may be tapered fiber couplers or other suitable couplers. An output optical coupler may be FIG. 9 shows another example of the applications of the modulator in FIG. 6: a coupled opto-electronic oscillator (COEO) 900 having an electro-optic WGM resonator modulator 610. Examples of COEOs and their operations are described in U.S. Pat. Nos. 5,929,430 and 6,567,436, which are incorporated herein by reference in their entirety. In general, a COEO directly couples a laser oscillation in an optical feedback loop or a laser cavity to an electrical oscillation in an opto-electronic feedback loop. The opto-electronic loop generally includes an optical section and an electronic section that are interconnected by an optical detector. The optical section may be used to provide a long loop delay that effectively suppress the phase noise in the oscillation signals. Such a long optical delay may be difficult to achieve electronically. The open loop gain for the opto-electronic loop is greater than the corresponding loss so an oscillation can be generated and sustained in the opto-electronic loop. The laser oscillation and the electrical oscillation are correlated with each other so that both the modes and stability of one oscillation are coupled with those of the other oscillation. The optical feedback loop or the laser cavity includes a gain medium to produce a loop gain greater than the optical loss in the laser cavity to effectuate and sustain the laser oscillation. This optical loop may be implemented by a Fabry-Perot resonator, a ring resonator, or other resonator configurations. The coupling between two feedback loops is achieved by controlling the loop gain of the optical loop by an electrical signal generated by the opto-electronic feedback loop. COEOs can achieve a single-mode RF or microwave oscillation without a RF or microwave bandpass filter or any additional opto-electronic feedback loops.

The coupled OEO 900 in FIG. 9 has two coupled oscillating loops. The first oscillating loop is a laser ring cavity 910 that includes an optical amplifier 820, an intracavity electro-optic modulator 610, and an optical delay element 940. When the optical amplifier 820 is implemented as an optically-pumped gain medium, a pump coupler 830 and a pump source 801 are used to direct the pump beam 802 at the pump wavelength into the amplifier 820 to produce the laser gain at the laser wavelength. In the ring 910, the total gain at the laser wavelength exceeds the optical loss so the laser oscillation at the laser wavelength can be generated and sustained. The WGM resonator modulator 610 modulates the laser light in the ring 910 to achieve the active laser mode locking. Different from the laser 800 in FIG. 8, however, the coupled OEO 800 includes a second oscillation loop formed by at least the resonator modulator 610, an optical coupler 901, an optical delay element 920, an optical detector 922, an electrical amplifier 924 which supplies a modulation signal 926 to control the modulator 610. This second oscillating loop also has a loop gain greater than the total loss in the loop to generate and sustain an oscillation at the modulation frequency of the modulator 610. In implementations, the optical delay element 920 may be a fiber loop or an optical resonator such as a WGM resonator. The optical delay element 940 in the ring 910 may also be a fiber loop or a resonator. These two oscillating loops are coupled to each other by the modulator 610. This coupling is used here to achieve a compact actively mode-locked laser with high pulse repetition rate by generating the stable RF or microwave modulation signal through the opto-electronic loop. The transformation of the modulated light power into the RF or microwave signal is achieved via the photodetector 922. Hence, the laser light energy is converted directly to spectrally pure RF or microwave signals, using an electro-optic feedback loop containing a high-Q optical element, at a frequency limited only by the available optical modulation and detection elements. This frequency is the repetition frequency of the optical pulses generated in the system.

In the COEO 900, if the RF or microwave photonic loop is open, the ring laser 910 may generate several independent optical modes. The number of modes can be determined by the loop length and the linewidth of the gain of the optical amplifier. If the RF or microwave photonic loop is closed and sufficient RF or microwave amplification is available to insure RF or microwave oscillations in the system in the manner of usual OEO, the optical modes in the ring 910 become phase locked.

The laser radiation in the ring 910 propagates through the resonator modulator 610 and is coupled into the opto-electronic loop by using the coupler 901 to split a portion of the laser light in the ring 910. The electrical signal output from the detector 922 is amplified and filtered before it is fed back to the modulator 610. Since the noise performance of an oscillator is determined by the energy storage time, or quality factor Q, then the use of an optical storage element with a high Q or a long optical delay as the element 920 allows for the realization of extremely high Q's and thus spectrally pure RF or microwave signals.

In the COEO 900, the WGM resonator modulator 610 consumes much less power than many conventional electro-optic modulators. For example, broadband Mach-Zender modulators used in COEOs typically require one to a few Watts of microwave power to achieve a significant modulation. This means that either the photocurrent in COEO system should be amplified significantly, or the laser loop of the COEO should operate much above laser threshold to produce enough optical radiation as the source of the drive power for the OEO. If the microwave power sent to the modulator is small, the information about the microwave signal simply will not be transduced to light through the EOM. The WGM resonator modulator 610 in the coupled OEO 900 is a high-Q resonator and thus can reduce the controlling power by many orders of magnitude in comparison to conventional electro-optic modulators.

In addition to the optical modulation and the coupler between the two oscillating loops, the WGM resonator modulator 610 in FIG. 9 also simultaneously operates as a high-Q filter to remove or significantly reduce the low timing jitter of the generated pulses. This is a significant advantage over some other COEOs without this filtering mechanism by the WGM resonator.

Figure 10:
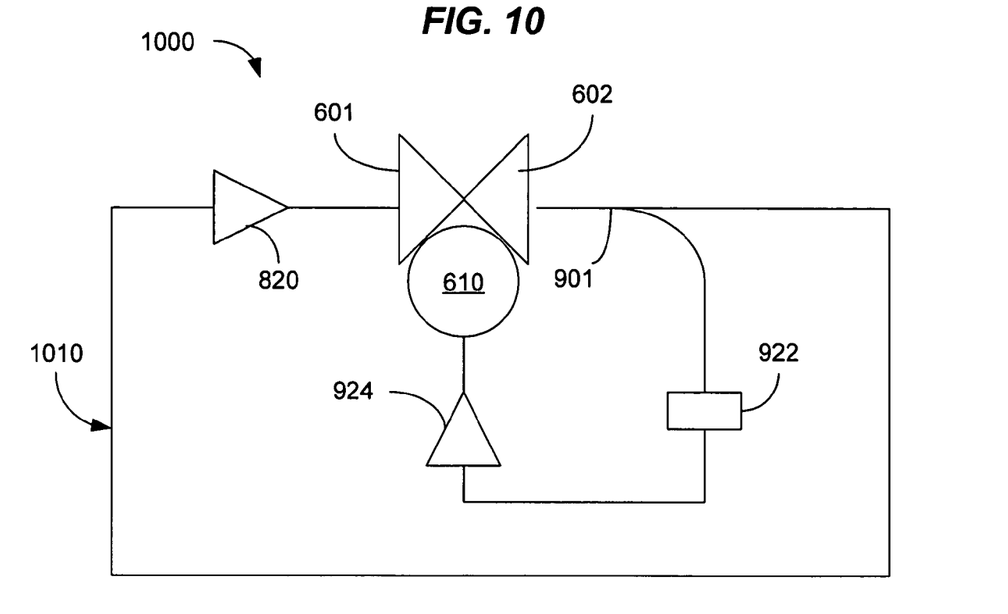

In the COEO 900, the WGM resonator 610 is optically coupled in both the ring 910 and the opto-electronic loop. Hence, for certain applications, the optical delay element 940 in the ring 910 and the optical delay element 920 in the opto-electronic loop may be eliminated because the WGM resonator 610 alone may be sufficient to provide the desired optical delays in both loops. FIG. 10 illustrates such a simplified COEO 1000. Optionally, the optical amplifier 820 may also be eliminated when the WGM resonator 610 uses a material that exhibits both the electro-optic effect and the laser gain at the laser wavelength under optical pumping. These designs reduce the number of optical elements in the device and the cost of the device.

Figure 11:
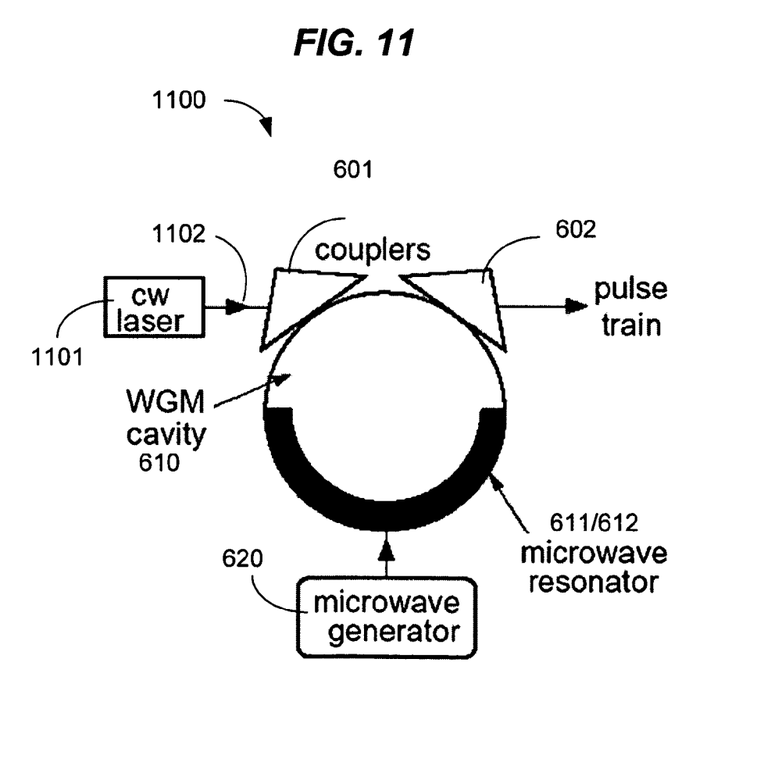
FIG. 11 shows an exemplary optical frequency comb generator using the electro-optic WGM resonator modulator in FIGS. 6A and 6B.

As yet another example, FIG. 11 shows an example of an optical frequency comb generator 1100 based on the electro-optic WGM resonator modulator 600 in FIGS. 6A and 6B. The optical comb generator 1000 uses a CW laser 1101 to provide a CW laser beam to the input coupler 601. The coupler 610 couples the input CW light into the WGM resonator 610 for optical modulation to produce multiple modulation sidebands that are the comb in the frequency domain. Such modulated light is then coupled by the output coupler 602 as the pulsed optical output. Various other optical frequency comb generators use an intracavity electro-optical modulator. The comb generator 1100 uses the electro-optic WGM resonator modulator outside the laser resonator for the laser 1101 to modulate the CW output 1102 of the laser 1101.

The comb generator 1100 can produce a comb of optical harmonics due to the electro-optic modulation. Different from conventional WGM resonators, the WGM resonator 610 in the device 100 provides special features. First, WG modes of the WGM resonator 610 have a high finesse. Second, the geometrical dispersion introduced by the cavity structure is generally small compared with the material dispersion. Therefore, the number of harmonics produced by the modulation in WGM resonator 610 may be as large as in a Fabry-Perot resonator with a conventional electro-optic modulator inside.

The value of power, $W_k$, of a kth sideband generated by the WGM resonator modulator operating in an unsaturated regime may be estimated as follows:

$$W_k \approx W_0 \exp\left(-\frac{\pi |k|}{\delta_e F}\right), \quad (21)$$

where k is a number of harmonic, $\delta_e$ is a single pass modulation coefficient defined in Equation (17), F is the finesse of the cavity, and $W_0$ is the optical pump power. The number of the sidebands is restricted by the cavity dispersion. In approximation of $F \to \infty$, the maximum frequency span of the generated harmonics can be estimated as follows:

$$2\pi \delta f_1 \approx \left(\frac{\delta_e}{\beta'' \pi R}\right)^{1/2}, \quad (22)$$

where it is assumed that the length of the electro-optic modulator is approximately $\pi R$, which is one half of the one round trip of the WGM resonator with a circular equator of radius R. Equation (22) shows that the generation of wide spectra can be generated by the comb generator 1100 to produce a trains of picosecond pulses.

Although only a few implementations are disclosed, it is understood that variations and enhancements may be made.

What is claimed is:

1. A device, comprising:
   an optical resonator supporting whispering gallery modes and comprising an optical material which exhibits an electro-optical effect and an optical gain at a laser wavelength when optically pumped by light at a pump wavelength, said optical resonator to modulate light in response to a control electrical signal;
   an optical coupler to couple a pump beam at said pump wavelength into a pump whispering gallery mode in said optical resonator to produce laser light in a laser whispering gallery mode at said laser wavelength; and
   an electrical unit having electrodes formed on said optical resonator to apply said control electrical signal to said optical resonator to modulate said laser light to cause mode locking in said laser light to produce laser pulses.

2. The device as in claim 1, wherein said optical coupler comprises a prism coupler.

3. The device as in claim 1, wherein said optical coupler comprises a fiber coupler.

4. The device as in claim 1, wherein said optical coupler comprises a photonic bandgap material.

5. The device as in claim 1, further comprising a second optical coupler to couple said laser pulses out of said optical resonator to produce a pulsed laser output.

6. The device as in claim 5, wherein said second optical coupler includes a prism coupler.

7. The device as in claim 1, wherein said resonator is a sphere.

8. The device as in claim 1, wherein said optical resonator comprises a portion of a sphere.

9. The device as in claim 1, wherein said optical resonator has a non-spherical shape.

10. The device as in claim 9, wherein said optical resonator has a spheroidal shape.

11. The device as in claim 1, wherein said optical resonator has a disk shape.

12. The device as in claim 11, wherein said active ions comprise erbium.

13. The device as in claim 1, wherein said optical resonator has a ring shape.

14. The device as in claim 1, wherein said optical material includes $LiNbO_3$ and is doped with active ions which produce said optical gain.

15. The device as in claim 1, wherein said electrodes form an electrical resonator.

16. The device as in claim 1, wherein said electrical resonator has a resonant frequency substantially at a frequency difference between laser whispering gallery modes.

17. The device as in claim 1, wherein said optical resonator comprises:
    a resonator core that exhibits said electro-optic effect and modulates light in response to the control electrical signal; and
    an active layer formed on said resonator core to produce said optical gain at said laser wavelength and to produce said laser light.

18. The device as in claim 1, wherein said active layer is a layer doped with Erbium ions.

19. The device as in claim 18, wherein said active layer is a solgel layer.

20. A method, comprising:
    providing a whispering gallery mode (WGM) resonator to exhibit both an electro-optic effect for optical modulation and an optical gain at a laser wavelength when optically pumped at a pump wavelength;
    coupling pump light at the pump wavelength into the WGM resonator to generate laser light in a plurality of whispering gallery modes at the laser wavelength; and
    applying an electrical control signal to the resonator to modulate the laser light and to lock the whispering gallery modes at the laser wavelength to produce laser pulses.

21. The method as in claim 20, further comprising using an electrical resonator formed on the WGM resonator to apply the electrical control signal.

22. The method as in claim 20, further comprising using a prism to couple the pump light into the WGM resonator.

23. The method as in claim 20, further comprising using a fiber coupler to couple the pump light into the WGM resonator.

24. The method as in claim 20, further comprising using a photonic gap material to couple the pump light into the WGM resonator.

25. A device, comprising:
    an optical ring having a gain section to produce an optical gain at a laser wavelength and carrying laser light at the laser wavelength; and
    an electro-optic modulator separate from and optically coupled in said optical ring to modulate the laser light in response to a modulator control signal, said modulator comprising a whispering gallery mode (WGM) resonator which exhibits an electro-optical effect, electrodes on said WGM resonator to receive the modulator control signal, and a controller to produce the modulator control signal.

26. A device, comprising:
    an optical ring having a gain section to produce an optical gain at a laser wavelength and carrying laser light at the laser wavelength; and an electro-optic modulator coupled in said optical ring to modulate the laser light in response to a modulator control signal, said modulator comprising a whispering gallery mode (WGM) resonator which exhibits an electro-optical effect, electrodes on said WGM resonator to receive the modulator control signal, and a controller to produce the modulator control signal, wherein said gain section comprises a semiconductor optical amplifier.

27. A device, comprising:
an optical ring having a gain section to produce an optical gain at a laser wavelength and carrying laser light at the laser wavelength; and
an electro-optic modulator coupled in paid optical ring to modulate the laser light in response to a modulator control signal, said modulator comprising a whispering gallery mode (WGM) resonator which exhibits an electro-optical effect, electrodes on said WGM resonator to receive the modulator control signal, and a controller to produce the modulator control signal,
wherein said gain section comprises an optical material that absorbs pump light at a pump wavelength to produce light at the laser wavelength.

28. The device as in claim 27, further comprising a pump coupler in said optical ring to couple the pump light into said gain section.

29. The device as in claim 27, wherein said gain section is a doped fiber amplifier.

30. A device, comprising:
an optical ring having a gain section to produce an optical gain at a laser wavelength and carrying laser light at the laser wavelength;
an electro-optic modulator coupled in said optical ring to modulate the laser light in response to a modulator control signal, said modulator comprising a whispering gallery mode (WGM) resonator which exhibits an electro-optical effect, electrodes on said WGM resonator to receive the modulator control signal, and a controller to produce the modulator control signal,
an optical coupler coupled in said optical ring to split a portion of the laser light in said optical ring;
an optical detector to convert light from said optical coupler into an electrical detector signal; and
an electrical section to receive and process the electrical detector signal to produce the modulator control signal.

31. The device as in claim 30, wherein a signal gain for a signal loop comprising said modulator, said optical coupler, said optical detector, and said electrical section is greater than a total signal loss in the signal loop.

32. The device as in claim 30, wherein said electrical section comprises an electrical amplifier which amplifies the modulator control signal.

33. The device as in claim 30, wherein said optical coupler directly delivers the portion of the laser light into said optical detector without an optical delay element between said optical coupler and said optical detector.

34. A device, comprising:
a ring laser comprising a ring loop with a first loop gain greater than optical loss in said ring loop to produce laser light;
a whispering gallery mode (WGM) resonator coupled in said ring laser to transmit the laser light from side of said WGM resonator to another side of said WGM resonator in said ring loop, said WGM resonator comprising an electro-optic material and operable to modulate the laser light in response to an electrical control signal;
an optical coupler in said ring fiber to split a fraction of the laser light to produce an optical feedback signal;
an optical detector to convert the optical feedback signal into a detector signal; and
an electrical section electrically coupled between said optical detector and said modulator to process said detector signal to produce the electrical control signal.

35. The device as in claim 34, wherein said ring loop is a fiber ring.

36. The device as in claim 34, wherein said WGM resonator exhibits a laser gain to produce the laser light in the ring laser.

37. A device, comprising:
a CW laser to produce a CW laser beam; and
an optical resonator supporting whispering gallery modes and comprising an optical material which exhibits an electro-optical effect, said optical resonator optically coupled to receive the CW laser beam and to modulate the CW laser beam in response to a control electrical signal to produce laser pulses that have a spectral comb formed by modulation bands produced by the modulation.

\* \* \* \* \*